(12) United States Patent
Akhoury et al.

(10) Patent No.: US 10,963,624 B2
(45) Date of Patent: Mar. 30, 2021

(54) WEB UI AUTOMATION MAINTENANCE TOOL

(71) Applicant: Citrix Systems, Inc., Fort Lauderdale, FL (US)

(72) Inventors: Arnav Akhoury, Karnataka (IN); Sreekanth Challa, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 191 days.

(21) Appl. No.: 15/969,044

(22) Filed: May 2, 2018

(65) Prior Publication Data

US 2019/0340224 A1 Nov. 7, 2019

(51) Int. Cl.
*G06F 9/455* (2018.01)
*G06F 40/14* (2020.01)
*G06F 8/65* (2018.01)
*G06F 16/958* (2019.01)
*G06F 11/26* (2006.01)

(52) U.S. Cl.
CPC ............... *G06F 40/14* (2020.01); *G06F 8/65* (2013.01); *G06F 9/455* (2013.01); *G06F 11/26* (2013.01); *G06F 16/986* (2019.01)

(58) Field of Classification Search
CPC .......... G06F 17/20; G06F 17/30; G06F 16/20; G06F 16/30; G06F 3/04; G06F 11/36; G06F 2221/03; G06F 9/455; G06F 11/26; G06F 3/04
See application file for complete search history.

(56) References Cited

U.S. PATENT DOCUMENTS

| 2009/0217302 | A1* | 8/2009 | Grechanik | G06F 8/70 719/320 |
| 2009/0217303 | A1* | 8/2009 | Grechanik | G06F 8/38 719/320 |
| 2011/0016453 | A1* | 1/2011 | Grechanik | G06F 11/368 717/125 |
| 2012/0023485 | A1* | 1/2012 | Dubey | G06F 8/30 717/125 |
| 2018/0260310 | A1* | 9/2018 | Vorganti | G06F 11/3684 |

* cited by examiner

*Primary Examiner* — Sanchita Roy
(74) *Attorney, Agent, or Firm* — Allen, Dyer, Doppelt + Gilchrist, PA

(57) ABSTRACT

A web UI automation maintenance tool includes a memory and a processor. The memory stores UI automation scripts for an initial web page that includes elements to be displayed for the web page, with each element having an element identifier. The processor determines web page specifics for the initial web page, including the attributes for each of the elements. After the initial web page has been updated, the processor determines the web page specifics for the updated web page. The processor compares, for each element, attributes from the initial web page to the updated web page, and identifies a new element identifier for each element that changed from the initial web page to the updated web page. The UI automation script in the memory is updated with the new element identifiers for each element whose element identifier has changed.

20 Claims, 9 Drawing Sheets

*220*

| Upload Test Case File | |
|---|---|
| 222 — ☑ | I want to specify Product Categorization: — 224 |
| 228 — Select Product Category: | --Select-- ▼ — 226 |
| 232 — Select Product SubCategory: | --Select Product Category First-- ▼ — 230 |
| 234 — [Choose File] No File Chosen | Process File — 236 |

| Upload Test Case File | |
|---|---|
| ☑ | I want to specify Product Categorization: |
| 234 — [Choose File] No File Chosen | Process File — 236 |
| Select Product Category: | --Select-- ▼ |
| Select Product SubCategory: | --Select Product Category First-- ▼ |

FIG. 5

WEB UI AUTOMATION MAINTENANCE TOOL

TECHNICAL FIELD

The present disclosure relates to web UI automation scripts, and more particularly, to a maintenance tool that automatically updates web UI automation scripts.

BACKGROUND

User interface (UI) automation scripts automate user interactions on a web page. When UI changes are made in a web page, the same changes need to be reflected in the UI automation scripts. A web page will typically display a number of elements, and UI automation scripts interact with the elements by using element identifiers. The element identifiers may be based on certain attributes of the elements, such as 'id', 'css class name', 'xPaths', 'text', etc. Attributes provide additional information about the elements.

The elements in a web page can be represented by a document object model (DOM) tree. The xPaths are addresses of the elements in the document object model tree. Each xPath represents a path to take within the document object model tree to reach an element from a starting point. An example xPath is "Title=/bookstore/book[2]/title", where 'Title' is an element identifier. This xPath represents the title of the second book in the bookstore. When the same 'book' object is moved to a different location (analogous to UI elements being modified), the same xPath would now be invalid or would wrongly point at something entirely different. To ensure that the element identifier continues to point to the correct element, the value of 'Title' needs to be updated. This update to the UI automation scripts is a manual process, as typically performed by a web developer.

When such a change is made, wherein an object is moved from one location to another in a web page, other element identifiers are affected as well. Alternatively, when a change is made to an attribute of an element, its attribute based selector will fail to identify the element correctly. Such changes are very common on a website. When these changes are made, the element identifiers have to be continually updated to ensure that the UI automation scripts execute correctly. This situation occurs more frequently when the web page has a large number of elements, and when xPaths are used as element identifiers. Consequently, in this case, a change in one element of a web page may modify the xPaths for other elements within the same web page. Updating the element identifiers in the UI automation scripts can be a labor intensive effort when there are a large number of elements that have been updated for a web page.

SUMMARY

A web UI automation maintenance tool includes a memory configured to store UI automation scripts for an initial web page that includes elements to be displayed for the web page. A processor is coupled to the memory and may be configured to perform the following for the initial web page: identify the elements on the initial web page, with each element having an element identifier associated therewith; identify attributes associated with each element; and store the identified elements, element identifiers, and attributes in the memory.

The processor may be further configured to receive an update to the initial web page, and to perform the following for the updated web page: identify elements on the updated web page, with each element having an element identifier associated therewith; identify attributes associated with each element; and store the identified elements, element identifiers, and attributes in the memory.

The processor may then compare, for each element, attributes from the initial web page to the updated web page, and identify a new element identifier for each element that changed from the initial web page to the updated web page. The processor updates the new element identifiers in the UI automation script in the memory for each element whose element identifier has changed. This is automatically performed without requiring manual intervention, which advantageously reduces the time and effort spent in maintaining web UI automation scripts.

The web UI automation maintenance tool uses a black-box approach for identifying elements in a web page, i.e., without using the source code used for development or the development environment. The web UI automation maintenance tool, which may also be referred to as an update detector, uses the elements rendered on a web browser, i.e., the final html that a browser understands. This ensures that the web UI automation maintenance tool can work with all kinds of web pages irrespective of the language and technology used for developing it.

The element identifier corresponds to an address for each respective element. Each web page may be represented by a document object model tree, and the address identifies a location of the respective element on the document object model tree.

The attributes may comprise at least one of text, location and type. Each element may be defined as a rectangle, with the location corresponding to a corner of the rectangle, and with the location further including a width and height of the rectangle. The text describes the element that is to be displayed on each web page. The type corresponds to at least one of a click button, drop down menu, a check box, and a text box.

The processor may be further configured to identify if a new element has been added to the updated web page that was not in the initial web page, and to generate a report if a new element has been added since an update will not be performed.

Similarly, the processor may be further configured to identify if an element in the initial web page has been removed from the updated web page, and to generate a report if an element has been removed since an update will not be performed.

Another aspect is directed to a method for updating UI automation scripts using a web UI automation maintenance tool comprising a processor and a memory coupled to the processor, with the method comprising storing UI (user interface) automation scripts in the memory for an initial web page comprising elements to be displayed for the web page. The processor is operated to perform the following steps for the initial web page: identifying the elements on the initial web page, with each element having an element identifier associated therewith; identifying attributes associated with each element; and storing the identified elements, element identifiers, and attributes in the memory.

The method may further comprise operating the processor to receive an update to the initial web page, and to perform the following steps for the updated web page: identifying elements on the updated web page, with each element having an element identifier associated therewith; identifying attributes associated with each element; and storing the identified elements, element identifiers, and attributes in the memory.

The method may further comprise comparing, for each element, attributes from the initial web page to the updated web page, and identifying a new element identifier for each element that changed from the initial web page to the updated web page. The processor updates the new element identifiers in the UI automation script in the memory for each element whose element identifier has changed.

Yet another aspect is directed to a non-transitory computer readable medium for updating UI automation scripts using a web UI automation maintenance tool comprising a processor and a memory coupled to the processor, and with the non-transitory computer readable medium having a plurality of computer executable instructions for causing the web UI automation maintenance tool to perform steps as described above.

BRIEF DESCRIPTION OF THE DRAWINGS

FIG. 4 is an initial web page received by the web UI automation maintenance tool illustrated in FIG. 3.

FIG. 5 is an updated web page received by the web UI automation maintenance tool illustrated in FIG. 3.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
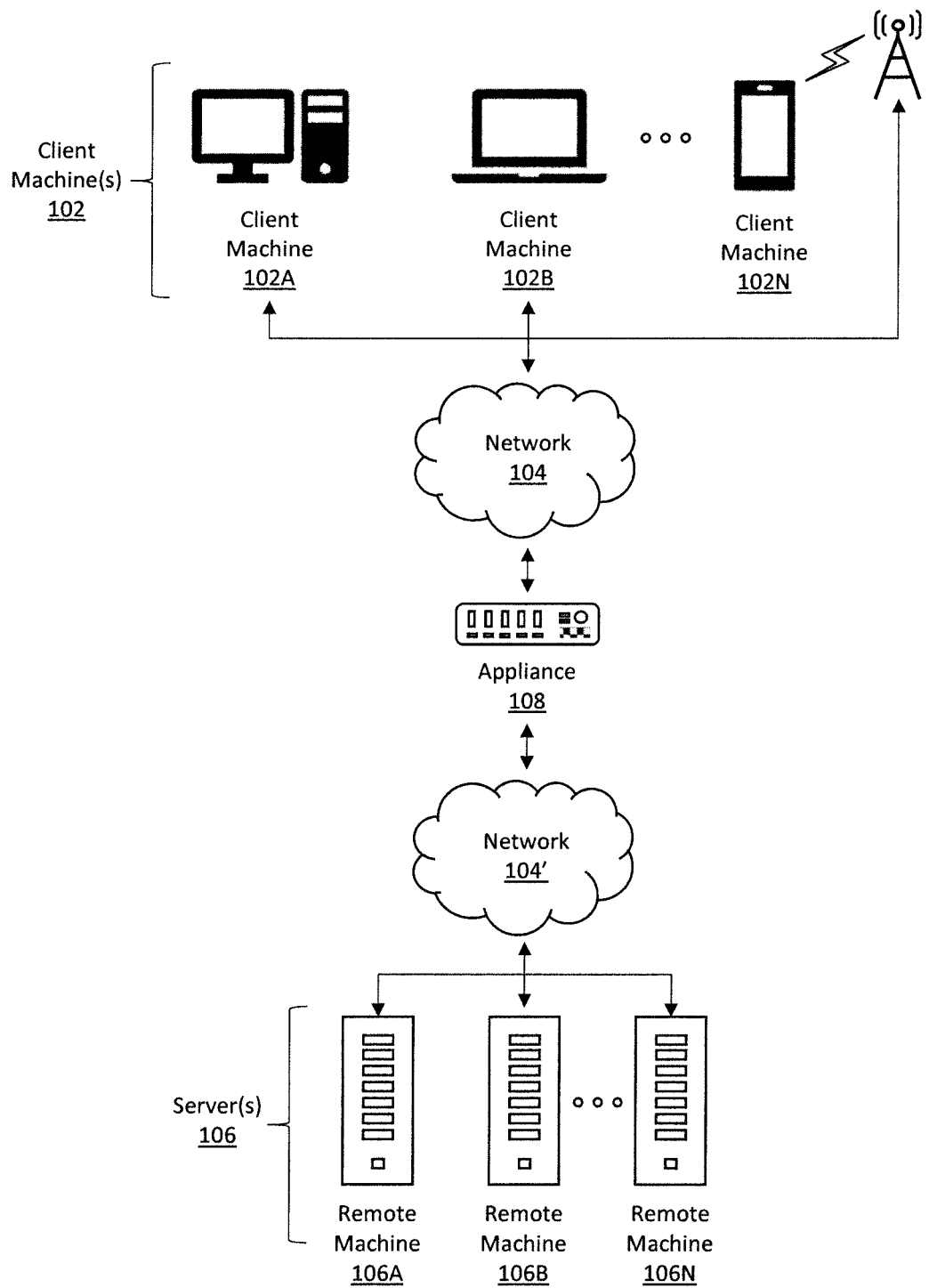
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
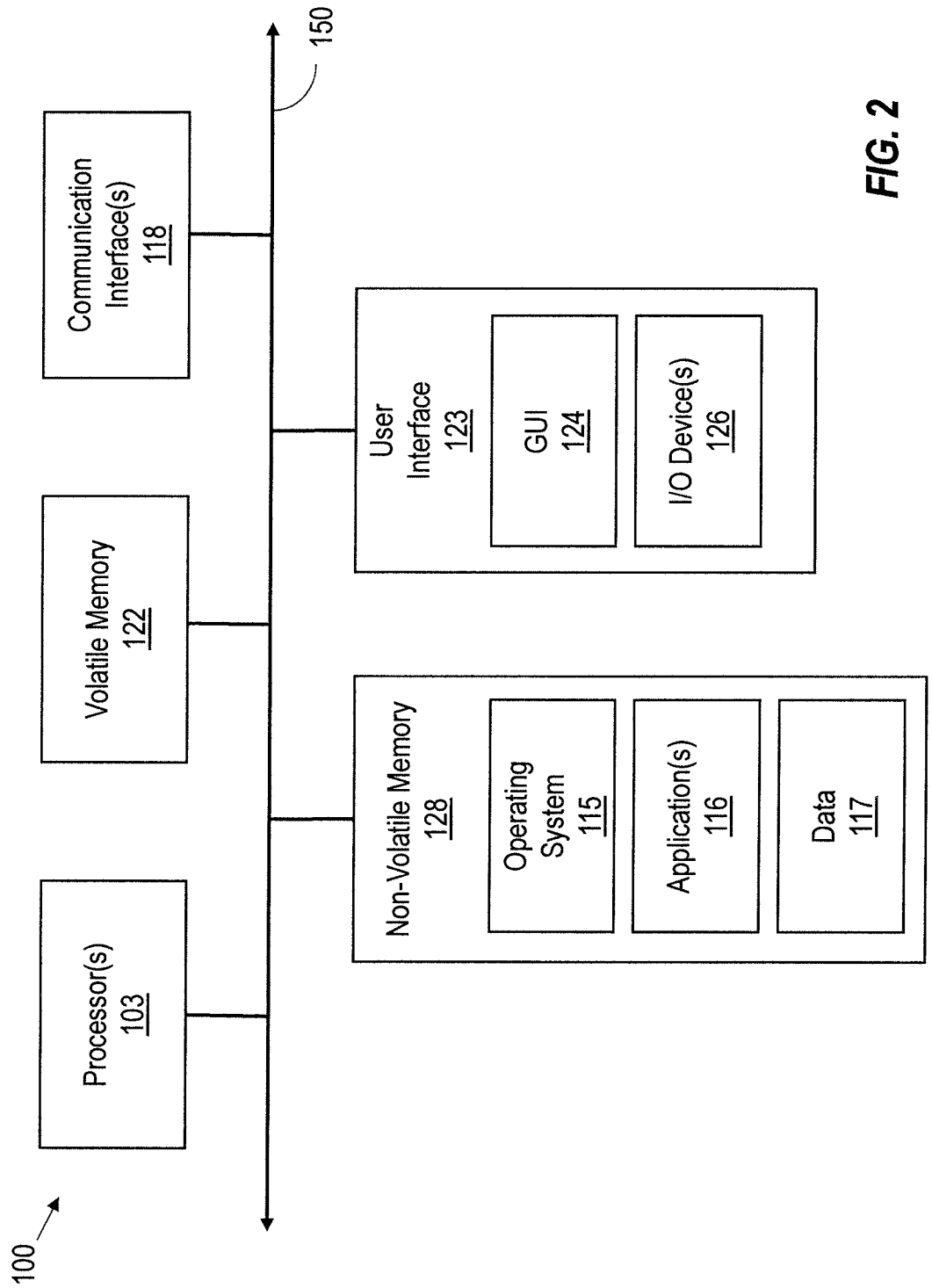
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
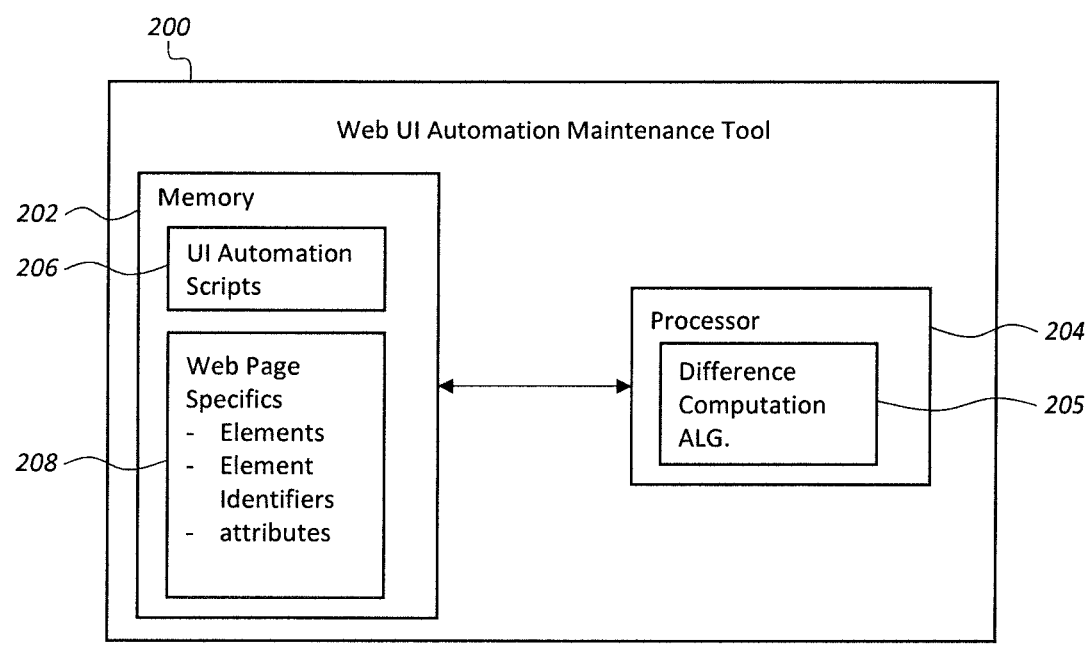
FIG. 3 is a block diagram of a web UI automation maintenance tool in which various aspects of the disclosure may be implemented.

Referring initially to FIG. 3, a web UI (user interface) automation maintenance tool 200 will be discussed. The web UI automation maintenance tool 200 includes a memory 202 and a processor 204 coupled to the memory. UI automation scripts 206 for web pages as generated by the processor 204 are stored in the memory 202. UI automation scripts 206, which may also be referred to as UI automation code 206, automate user interactions on a web page so that a web browser can then allow a user to interface the web via the web page. When UI changes are made in a web page, the same changes need to be reflected in the UI automation scripts.

The processor 204 also stores in the memory 202 web page specifics 208 for initial and updated web pages. The web page specifics 208 include elements, element identifiers and attributes associated with the initial and updated web pages. The attributes provide additional information about the elements. When updates are made to an initial web page, the UI automation scripts 206 also need to be updated. As discussed in the background, updates to the UI automation scripts is a manual process, and are typically performed by a web developer.

The web UI automation maintenance tool 200 advantageously reduces the time and effort spent in maintaining web UI automation scripts 206. As will be discussed in greater detail below, the web UI automation maintenance tool 200 executes a difference computation algorithm 205 to identify changes in any of the elements of a web page and then updates the element identifiers for the changed elements in the UI automation scripts 206, thereby removing the need for manual intervention for the updates.

Operation of the web UI automation maintenance tool 200 will be discussed for an initial web page 220 and for updates made to the initial web page. The initial web page 220 is illustrated in FIG. 4, and the updated web page 240 is illustrated in FIG. 5.

In order to automate a web page, there is a need to interact with the elements on the web page. For example, performing a 'click' operation is one such interaction. To perform such interactions or operations, elements on the web page need to be identified with element identifiers. Element identifiers are of various types, but the web UI automation maintenance tool 200 uses 'xPaths' because they are the most generic type identifier and can be used to identify/address any element on a given web page.

In the initial web page 220, there are eight elements. The eight elements include one check box 232; two drop down menus 226, 230; three labels 224, 228, 232; and two click buttons 234, 236. Starting at the top of the web page 220, on a first line is the check box 222 and a label 224 for the check-box 222. The label 224 provides 'I want to specify product categorization.'

At the next line down is a first drop down menu 226 and a first label 228. The first label 228 provides 'select product category' with the selection being made via the first drop down menu 226. At the next line down is a second drop down menu 230 and a second label 232. The second label 232 provides 'select product subcategory' with the selection being made via the second drop down menu 230. At the last line are the two click buttons 234, 236. The first click button 234 is for choosing a file ('choose file'), and the second click button 236 is for processing ('process file') the file.

Each of the eight elements on the initial web page 220 has a respective element identifier associated therewith. The UI automation scripts 206 for the initial web page 220 make use of the element identifiers. For the 'process file' click button 236, its element identifier is as follows:

//*[@id="form1"]/div[5]/div/div/div[2]/div[3]/div/div[2]/button

As will be discussed in greater detail below, each web page can be represented as a document object model (DOM) tree. When the element identifier is an 'xpath' it represents where the corresponding element is located on the document object model DOM tree. For the 'process file' click button 236, the processor 204 within the web UI automation maintenance tool 200 incorporates its element identifier into the UI automation scripts 206. The UI automation script 206 for the 'process file' click button 236 is as follows:

ClickElement(FindElementByXPath{"//*[@id="form1"]/div[5]/div/div/div[2]/div[3]/div/div[2]/button"))

In this example, an updated version of the same web page 220 is to be released by the web developer. In the updated web page 240, the 'process file' click button 236 is moved to a different location. The 'process file' click button 236 is moved to the line below the check box 222. As a result, the element identifier for the moved 'process file' click button 236 is changed as follows:

//*[@id="form1"]/div[5]/div/div/div[2]/div[2]/div/div[2]/button

To accommodate this change and to ensure that the UI automation scripts 206 work as expected on the new version of the web page, the processor 204 executes the difference computation algorithm 205 to compare web page specifics 208 between the initial web page 220 stored in the memory 202 and the updated web page 240. Based on the elements that have changed, the processor 204 modifies the element identifiers to the new values at all the places in the UI automation scripts 206 where used. The UI automation scripts 206 for the 'process file' click button 236 is modified as follows:

ClickElement(FindElementByXPath("//*[@id="form1"]/div[5]/div/div/div[2]/div[2]/div/div[2]/button"))

Once an update has been detected, as in the new location of the process file' click button 236, the UI automation script 206 is automatically changed without requiring manual intervention. In addition to updating the 'process file' click button 236, the other elements below the check box 222 will also need to be updated since they are moved to make room for the 'process file' click button 236. Consequently, the element identifiers for these elements are likewise updated in the UI automation scripts 206. Finding the difference among the elements of two instances of the same web page 220, 240 and updating the element identifiers in the UI automation scripts 206 reduces the time and effort spent in maintaining web UI automation scripts 206.

Figure 6:
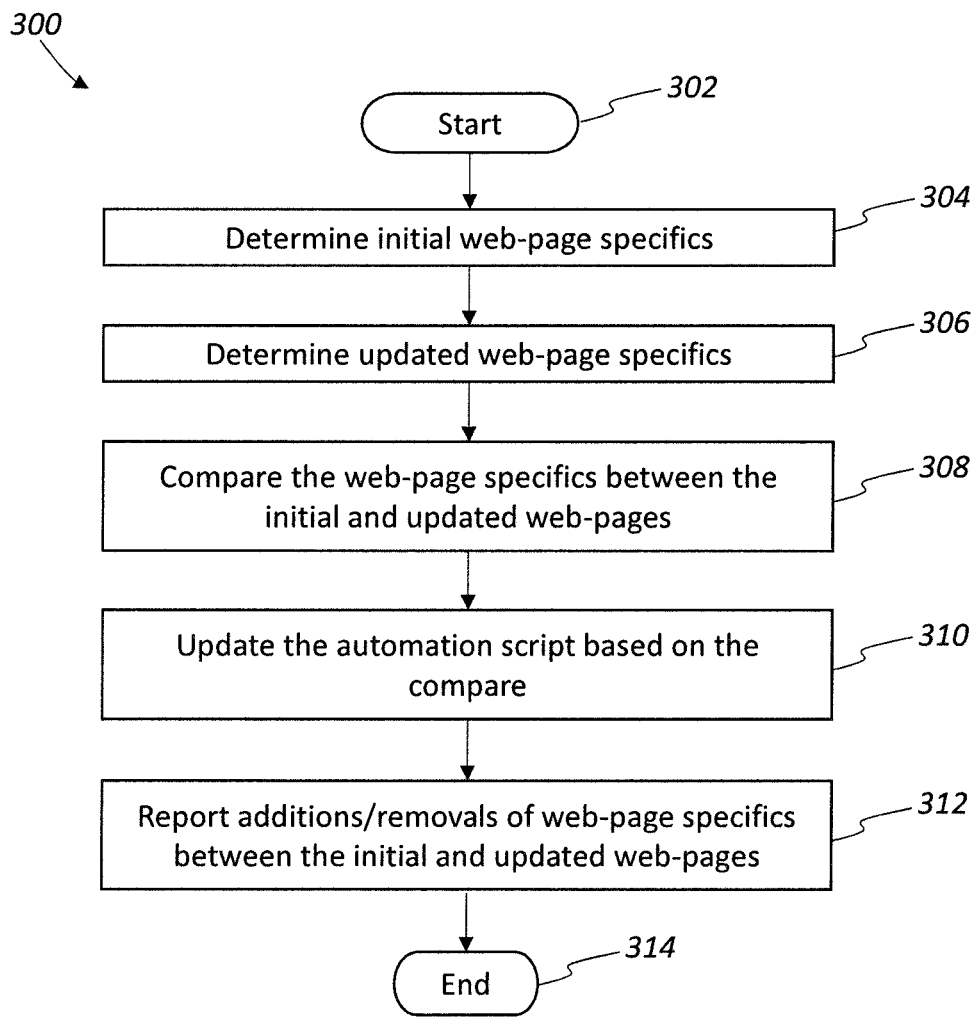
FIG. 6 is a general flowchart illustrating a method for operating the web UI automation maintenance tool illustrated in FIG. 3.

Referring now to the flowchart 300 in FIG. 6, and generally speaking, a method for updating UI automation scripts 206 with the web UI automation maintenance tool 200 is provided. From the start (Block 302), initial web page specifics 208 are determined at Block 304 for the initial web page 220. The initial web page specifics 208 include elements, element identifiers and attributes of the elements. The element identifiers correspond to addresses of the elements, and the attributes provide additional information about the elements. After the initial web page 220 has been updated, then the updated web page specifics 208 are determined at Block 306 for the updated web page 240. The updated web page specifics 208 also include elements, element identifiers and attributes of the elements.

The web page specifics 208 between the initial and updated web pages 220, 240 are compared at Block 308. Based on the compare, the automation scripts 206 are then updated at Block 310. The updating is automatically performed without requiring manual intervention, which advantageously reduces the time and effort spent in maintaining web UI automation scripts 206. Also, additions/removals of web page specifics 208 between the initial and updated web pages 220, 240 are reported at Block 312. Here, the additions/removals of web page specifics 208 require manual intervention. The method ends at Block 314.

Figure 7:
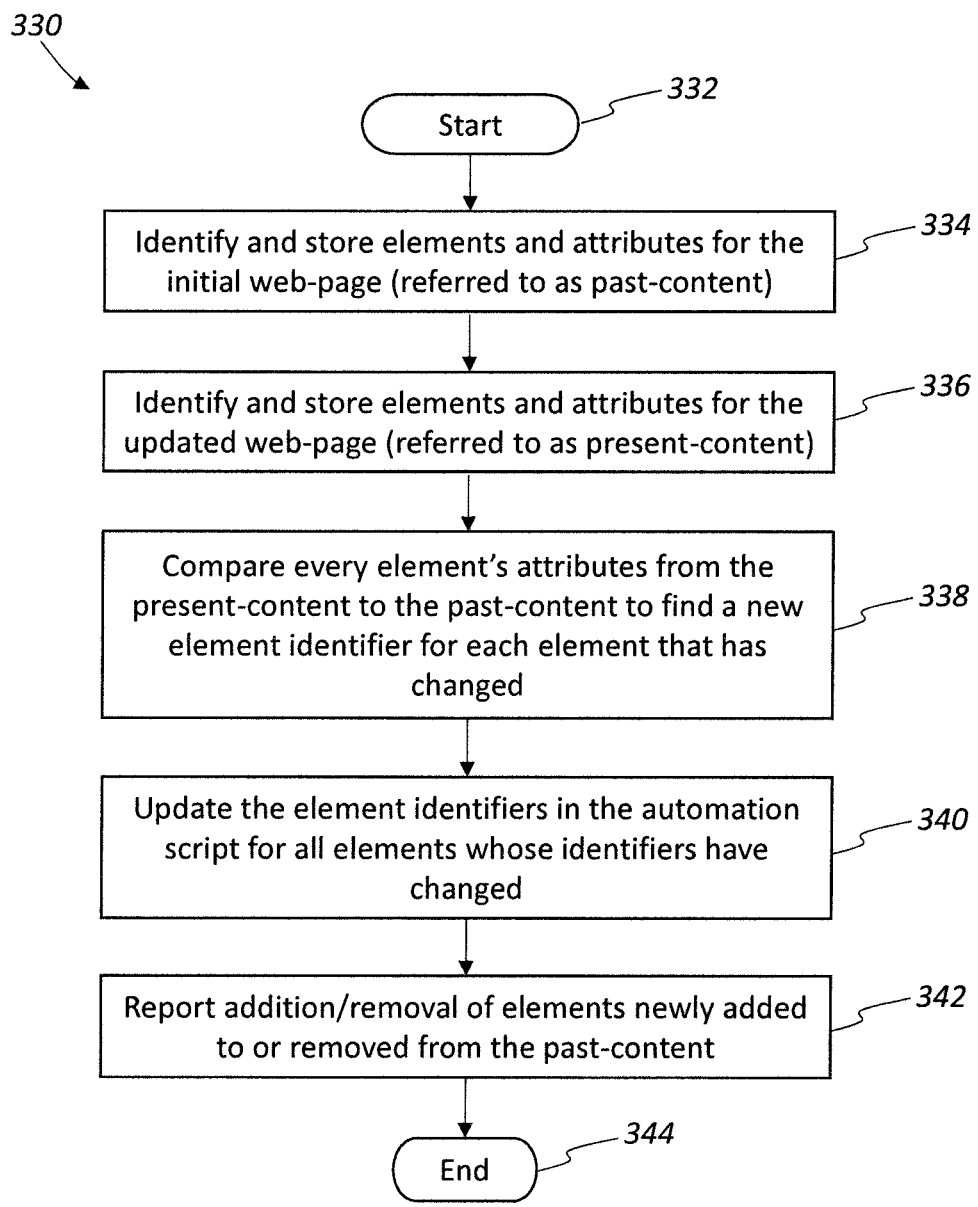
FIG. 7 is a more detailed flowchart illustrating a method for operating the web UI automation maintenance tool illustrated in FIG. 3.

Referring now to the flowchart 330 in FIG. 7, more detailed steps for updating UI automation scripts 206 with the web UI automation maintenance tool 200 will be discussed. From the start (Block 332), the elements and attributes for the initial web page 220 are identified and stored in the memory 202 at Block 334. The elements and attributes for the initial web page 220 are also referred to as 'past-content' since this is a historical representation of the initial web page 220. The automation scripts 206 for the initial web page 220 are also stored in the memory 202.

After updating the initial web page 220, then the elements and attributes for the updated web page 240 are identified and stored in memory 202 at Block 336. The elements and attributes for the updated web page 220 are also referred to as 'present-content' since this is a current representation of the updated web page 240.

The difference computation algorithm 205 as executed by the processor 204 at Block 338 compares every element's attributes from the past-content to every element's attributes in the present-content. The difference computation algorithm 205 thus determines the similarities between elements from a state of the initial web page 220 and a state of the updated web page 240 based on the attributes of these elements.

The processor 204 updates the element identifiers in the UI automation scripts 206 for all updated elements whose identifiers have changed at Block 340. The element identifiers correspond to addresses of the elements. The processor 304 is further configured to determine addition/removal of elements between the initial and updated web pages 220, 240. In other words, the processor 204 determines if some elements have been newly added to or removed from the past-content. Addition/removal of elements are reported at Block 342 for manual intervention. The method ends at Block 344.

Figure 8:
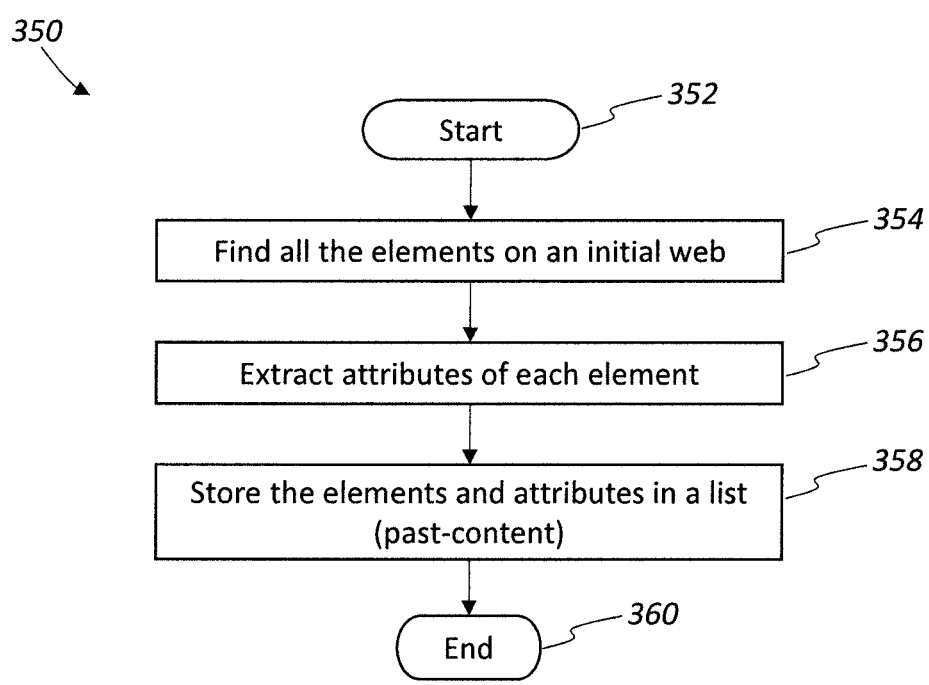
FIG. 8 is a flowchart illustrating the past-content step in the flowchart provided in FIG. 7.

Referring now to the flowchart 350 illustrated in FIG. 8, the steps performed by the processor 204 for determining the web page specifics 208 for the past-content will be discussed in greater detail. More particularly, the flowchart 350 expands on Block 334 as provided in the flowchart 330 in FIG. 7.

From the start (Block 352) all of the elements on the initial web page 220 are identified at Block 354. As discussed above in reference to the initial web page 220 illustrated in FIG. 4, there are eight elements: one check box 232; two drop down menus 226, 230; three labels 224, 228, 232; and two click buttons 234, 236.

Attributes for each of the elements are extracted at Block 356. Attributes provide additional information about the elements. For illustration purposes, the attributes of the 'process file' click button 236 will be discussed since this element is moved in the updated web page 240. The attributes for this element include text, location and type. These attributes are not to be limiting. Attributes in other examples may include the following: Alt for alternate, disabled, Href for hyperlink, Id for identifier, Src for source, Style, Title, images and radio-button.

The text attribute describes or names the 'process file' click button 236, and in this case, are the words 'process file'. The location attribute provides a x-y coordinate of the element on the web page 220. Since each element is generally defined as a rectangle, the x-y coordinate corresponds to a corner (e.g., top left) of the rectangle. The location attribute further includes a width and height of the rectangle. The type attribute corresponds to the element being a click button.

The elements and their attributes are stored in the memory 202 at Block 358. Storage of the elements and their attributes may be as an ordered list, for example. The flowchart 350 end at Block 360.

Figure 9:
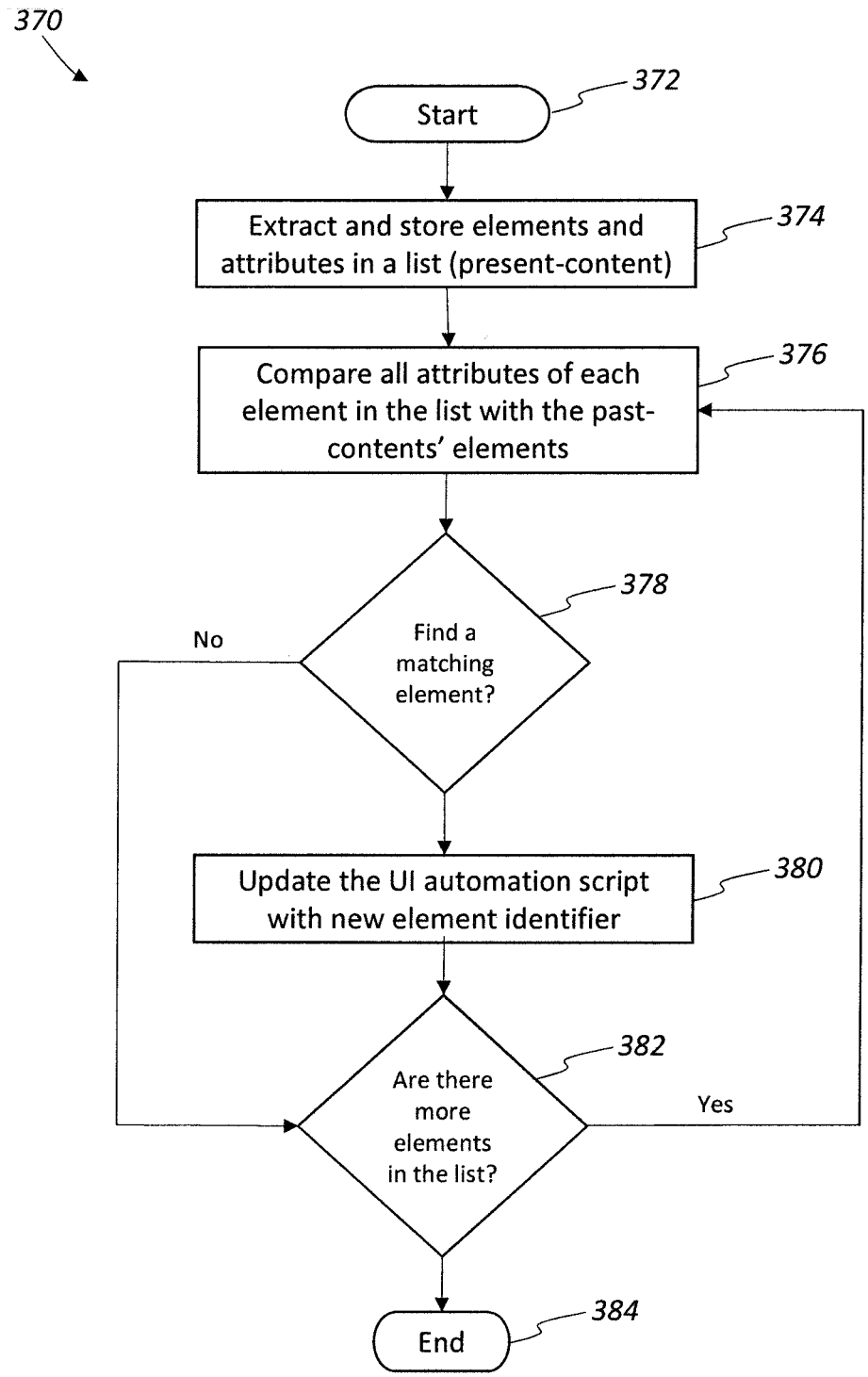
FIG. 9 is a flowchart illustrating the compare and update steps in the flowchart provided in FIG. 7.

Referring now to the flowchart 370 illustrated in FIG. 9, the steps performed by the processor 204 for determining the updates to the past-content will be discussed in greater detail. More particularly, the flowchart 370 expands on Blocks 338 and 340 as provided in the flowchart 330 in FIG. 7.

From the start (Block 372), the elements and attributes are extracted for the updated web page 240 at Block 374. The steps performed by the processor 204 for determining the present-content are similar to the steps outlined in the flowchart 350 for the past-content. Once the past-content and the present-content are both available, then all the attributes of each element are compared with the past-contents' elements at Block 376.

A determination is made at Block 378 if the compare step finds a match. If a match is found, then the UI automation script 206 is updated at Block 380 with the new element identifier for the matching element. As discussed above, an element identifier is an address for an element, and in this case, the address for the element on the updated web page 240. In the 'process file' click button 236 example, the element was moved to a new location on the updated web page 240. As a result, the UI automation script 206 is updated to include the new address for the 'process file' click button 236.

After the UI automation script 206 is updated with the new element identifier for the 'process file' click button 236, then a determination is made at Block 382 on if there are more elements in the compare list that are to be updated. Since the 'process file' click button 236 was moved to a different location on the updated web page 240, this will have a ripple effect on the locations of the other elements below for the 'process file' click button 236. Consequently, the compare and updates steps are repeated for each of the elements that were impacted. Once all the element identifiers have been updated in the UI automation scripts 206, then the flowchart 370 ends at Block 384.

The web UI automation maintenance tool 200 uses a black-box approach for identifying elements in a web page, i.e., without using the source code used for development or the development environment. The web UI automation maintenance tool 200, which may also be referred to as an update detector uses the elements rendered on a web browser, i.e., the final html that a browser understands. This ensures that the web UI automation maintenance tool 200 can work with all kinds of web pages irrespective of the language and technology used for developing it. Each element thus has an HTML format.

As discussed above, each web page can be represented as a document object model (DOM) tree. When the element identifier is an 'xpath' it represents where the corresponding element is located on the document object model DOM tree.

Figure 10:
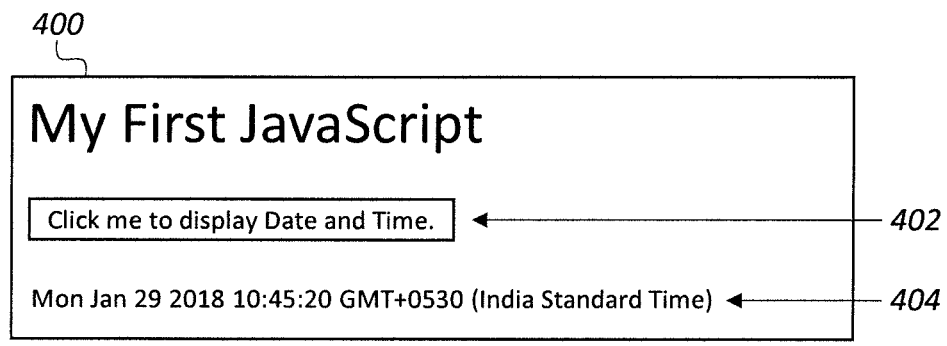
FIG. 10 is an example web page used to illustrate a document object model tree.

An example web page 400 used to illustrate a DOM tree is illustrated in FIG. 10. The web page contains HTML tags like <li> for list, <div> for division, <p> for paragraph, <button> for button, etc. These tags define the structure of the web page 400 and are referred to as the elements of the web page 400. The source code for the example web page is given below:

```
<!DOCTYPE html>
1.  <html>
2.  <body>
3.  <h1>My First JavaScript</h1>
4.  <button type="button" onclick="document.getElementById
    ('demo') .innerHTML = Date( )">
5.  Click me to display Date and Time.</button>
6.  <p id="demo"></p>
7.  </body>
8.  </html>
```

Figure 11:
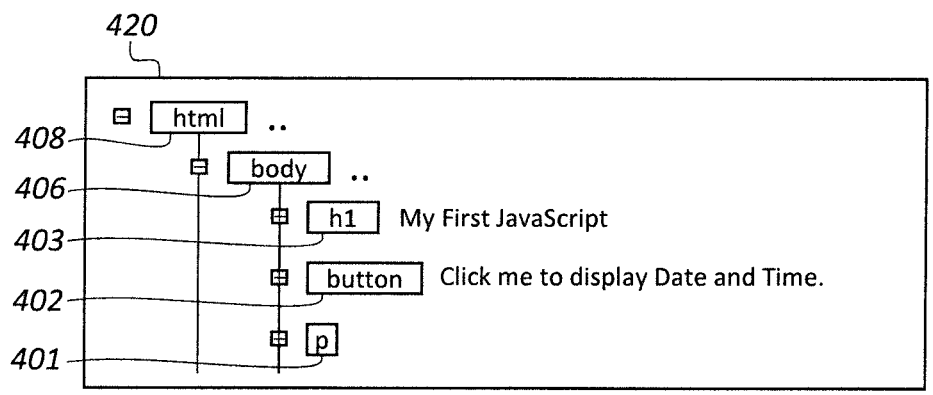
FIG. 11 is the document object model tree for the example web page illustrated in FIG. 10.

In the example web page 400, the "Click me to display Date and Time" is the name displayed for the button element 402, and the date/time text is in block 404. Referring now to the DOM tree 420 in FIG. 11, line 4 in the above source code describes the button element 402. Here, the button element 402 is a child of the <body> tag 406, which in turn is a child of the <html> tag 408. Consequently, xPpth for the button 402 is '/html/body/button'. Similarly, the xPath for the 'Date Time text' field is '/html/body/p'. To illustrate this further, the parent 'html' 408 has one child 'body' 406, and the 'body' has three children 'h1' 403, 'button' 402 and 'p' 401.

Yet another aspect is directed to a non-transitory computer readable medium for a central authentication service device 210 used in authenticating a user operating a computing device 220 requesting access to a service provider 230. The non-transitory computer readable medium has a plurality of computer executable instructions for causing the central authentication service device 210 to perform steps comprising storing UI automation scripts 206 in the memory 202 for an initial web page 220 comprising elements to be displayed for the web page. The processor 204 is operated to perform the following steps for the initial web page 220: identifying the elements on the initial web page 220, with each element having an element identifier associated therewith; identifying attributes associated with each element; and storing the identified elements, element identifiers, and attributes in the memory 202.

The processor 204 is further operated to receive an update to the initial web page 220, and to perform the following steps for the updated web page 240: identifying elements on the updated web page 220, with each element having an element identifier associated therewith; identifying attributes associated with each element; and storing the identified elements, element identifiers, and attributes in the memory 202.

The processor 204 is further operated to compare, for each element, attributes from the initial web page 220 to the updated web page 240, and identify a new element identifier for each element that changed from the initial web page 220 to the updated web page 240. The processor 204 updates the new element identifiers in the UI automation script 206 in the memory 202 for each element whose element identifier has changed.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A web UI automation maintenance tool comprising:
   a memory configured to store UI (user interface) automation scripts for an initial web page comprising elements to be displayed for the web page; and
   a processor coupled to said memory and configured to perform the following for the initial web page:
      receive the initial web page in an HTML format, with the HTML format including elements on the initial web page, element identifiers associated with the elements, and attributes associated with the elements,
      identify the elements on the initial web page,
      identify the attributes associated with each element, with the attributes providing additional information on the elements, and
      store the identified elements, element identifiers, and attributes in said memory;
   said processor further configured to receive an update to the initial web page, and to perform the following for the updated web page:
      receive the updated web page in an HTML format, with the HTML format including elements on the initial web page, element identifiers associated with the elements, and attributes associated with the elements,
      identify the elements on the updated web page,
      identify the attributes associated with each element, with the attributes providing additional information on the elements,
      store the identified elements, element identifiers, and attributes in said memory,
      compare, for each element having the HTML format, attributes from the initial web page to attributes of the updated web page to determine similarities between a state of the initial web page and a state of the updated web page,
      identify, based on the compare, a new element identifier for each updated element having an element identifier that was changed from the initial web page to the updated web page, and
      update the new element identifiers in the UI automation script in said memory based on the determined similarities between the states of the initial and updated web pages without requiring further input and without requiring manual intervention for the update.

2. The web UI automation maintenance tool according to claim 1 wherein each element identifier corresponds to an address for each respective element.

3. The web UI automation maintenance tool according to claim 2 wherein each web page is represented by a document object model tree, and with each address identifying a location of the respective element on the document object model tree.

4. The web UI automation maintenance tool according to claim 1 wherein the attributes comprise at least one of text, location and type.

5. The web UI automation maintenance tool according to claim 4 wherein each element is defined as a rectangle, with the location corresponding to a corner of the rectangle, and with the location further including a width and height of the rectangle.

6. The web UI automation maintenance tool according to claim 4 wherein the text describes the element that is to be displayed on each web page.

7. The web UI automation maintenance tool according to claim 4 wherein the type corresponds to at least one of a click button, drop down menu, a check box, and a text box.

8. The web UI automation maintenance tool according to claim 1 wherein each element has an HTML format.

9. The web UI automation maintenance tool according to claim 1 wherein said processor is further configured to identify if a new element has been added to the updated web page that was not in the initial web page, and to generate a report if a new element has been added since an update will not be performed.

10. The web UI automation maintenance tool according to claim 1 wherein said processor is further configured to identify if an element in the initial web page has been removed from the updated web page, and to generate a report if an element has been removed since an update will not be performed.

11. A method for updating UI automation scripts using a web UI automation maintenance tool comprising a processor and a memory coupled to the processor, the method comprising:
storing UI (user interface) automation scripts in the memory for an initial web page comprising elements to be displayed for the web page;
operating the processor to perform the following steps for the initial web page:
receiving the initial web page in an HTML format, with the HTML format including elements on the initial web page, element identifiers associated with the elements, and attributes associated with the elements,
identifying the elements on the initial web page,
identifying the attributes associated with each element, with the attributes providing additional information on the elements, and
storing the identified elements, element identifiers, and attributes in the memory; and
operating the processor to receive an update to the initial web page, and to perform the following steps for the updated web page:
receiving the updated web page in an HTML format, with the HTML format including elements on the initial web page, element identifiers associated with the elements, and attributes associated with the elements,
identifying the elements on the updated web page,
identifying the attributes associated with each element, with the attributes providing additional information on the elements,
storing the identified elements, element identifiers, and attributes in the memory,
comparing, for each element having the HTML format, attributes from the initial web page to attributes of the updated web page to determine similarities between a state of the initial web page and a state of the updated web page,
identifying, based on the comparing, a new element identifier for each updated element having an element identifier that was changed from the initial web page to the updated web page, and
updating the new element identifiers in the UI automation script in the memory based on the determined similarities between the states of the initial and updated web pages without requiring further input and without requiring manual intervention for the update.

12. The method according to claim 11 wherein each element identifier corresponds to an address for each respective element.

13. The method according to claim 12 wherein each web page is represented by a document object model tree, and with each address identifying a location of the respective element on the document object model tree.

14. The method according to claim 11 wherein the attributes comprise at least one of text, location and type.

15. The method according to claim 11 wherein each element has an HTML format.

16. A non-transitory computer readable medium for updating UI automation scripts using a web UI automation maintenance tool comprising a processor and a memory coupled to the processor, and with the non-transitory computer readable medium having a plurality of computer executable instructions for causing the web UI automation maintenance tool to perform steps comprising:
storing UI (user interface) automation scripts in the memory for an initial web page comprising elements to be displayed for the web page;
operating the processor to perform the following steps for the initial web page:
receiving the initial web page in an HTML format, with the HTML format including elements on the initial web page, element identifiers associated with the elements, and attributes associated with the elements,
identifying the elements on the initial web page,
identifying the attributes associated with each element, with the attributes providing additional information on the elements, and
storing the identified elements, element identifiers, and attributes in the memory; and
operating the processor to receive an update to the initial web page, and to perform the following steps for the updated web page:
receiving the updated web page in an HTML format, with the HTML format including elements on the initial web page, element identifiers associated with the elements, and attributes associated with the elements,
identifying the elements on the updated web page,
identifying the attributes associated with each element, with the attributes providing additional information on the elements,
storing the identified elements, element identifiers, and attributes in the memory,
comparing, for each element having the HTML format, attributes from the initial web page to attributes of the updated web page to determine similarities between a state of the initial web page and a state of the updated web page,
identifying, based on the comparing, a new element identifier for each updated element having an element identifier that was changed from the initial web page to the updated web page, and
updating the new element identifiers in the UI automation script in the memory based on the determined similarities between the states of the initial and updated web pages without requiring further input and without requiring manual intervention for the update.

17. The non-transitory computer readable medium according to claim 16 wherein each element identifier corresponds to an address for each respective element.

18. The non-transitory computer readable medium according to claim 17 wherein each web page is represented by a document object model tree, and with each address identifying a location of the respective element on the document object model tree.

19. The non-transitory computer readable medium according to claim 16 wherein the attributes comprise at least one of text, location and type.

20. The non-transitory computer readable medium according to claim 16 wherein each element has an HTML format.

\* \* \* \* \*